INVENTOR
W. W. RIGROD

United States Patent Office

3,436,665
Patented Apr. 1, 1969

---

3,436,665
MULTIPLE PASS OPTICAL CELL FOR LASER AMPLIFIER
William W. Rigrod, Millington, N.J., assignor to Bell Telephone Laboratories, Incorporated, New York, N.Y., a corporation of New York
Filed May 28, 1965, Ser. No. 459,607
Int. Cl. H01s 3/00; H03f 3/60; G02b 5/10
U.S. Cl. 330—4.3                          6 Claims

ABSTRACT OF THE DISCLOSURE

A four-mirror optical arrangement in which four surfaces having spherical curvature are arranged in opposing pairs with the centers of curvature of each pair defining lines which are orthogonally related. An injected light beam is incident on each mirror in a row of spots, the resultant folded beam path traversing a cylindrical volume, without beam path retracing, and with refocusing at least once for each four reflections.

Figure 1:
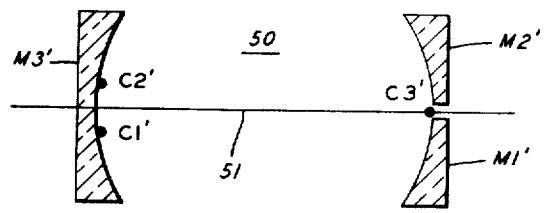

Optical feedback due to scattering at common reflection points on the mirror surfaces is reduced.

---

This invention relates to optical masers and, more particularly, to multiple pass optical cells useful in optical maser arrangements.

In a laser medium of substantially uniform unsaturated gain per unit length, the amplification of a light beam propagating therein increases with its path length through the medium. For many applications, however, the desired degree of light beam amplification exceeds the gain per pass of the appropriate laser medium for that wavelength. In such cases, a multple pass light deflection system is needed to permit the weak light beam to traverse the active medium many times before emerging at the desired high intensity. For maximum possible amplification, both the gain per pass of the active medium and the number of light passes therethrough must be as high as possible.

Attempts to increase the number of passes through the active medium have included placing the active medium within a three-mirror confocal cell designed by J. U. White, and disclosed in his article beginning at page 285 of vol. 32 of the Journal of the Optical Society of America (May 1942). In particular, L. E. S. Mathias and N. H. Rock in an article entitled "A Helium-Neon Laser Amplifier" at page 133 of the January 1965 issue of Applied Optics describe the properties of a multiple pass laser amplifier consisting of a helium-neon laser tube terminated by the three mirrors of a White cell.

When the gain per pass of the laser tube in such an arrangement is increased by pulsed excitation with a high power gaseous discharge, the usable number of transits therethrough is fixed by the low diffraction loss per pass of oscillating modes, which ultimately produces unwanted oscillations. In general, such unwanted oscillation can occur in a multiple pass laser amplifier with isotropic gain when a sufficient fraction of the amplified beam is reflected back on itself by scattering at the reflecting surfaces. The reflected fraction can be made smaller by increasing the diffraction losses for the unwanted modes. In addition, the over-all gain in the White cell geometry was limited by the restricted volume of the laser discharge traversed by the beam in its repeated passages through the tube, a consequence of the fact that the light paths lay in a thin slab-like region.

The object of the present invention is to increase the number of traversals through a high gain laser medium before the onset of self-oscillation.

A more specific object of the invention is to circulate the beam in an optical maser cell over a multiple pass geometry without path retracing and without reflection back upon itself at any single spot on a given end reflector.

In accordance with the invention, an optical cell characterized by a high oscillation threshold comprises a plurality of spaced mirrors between which an optical beam to be amplified is repeatedly reflected to traverse a cylindrical volume. In particular, four mirrors with spherically curved surfaces are arranged in opposing pairs with the centers of curvature of each pair defining lines which are orthogonally related. A light beam injected into the system is incident on each mirror in a row of spots, the rows of spots on each pair of reflectors being parallel, and the two sets of rows being orthogonal. The resultant folded beam path traverses a cylindrical volume, without beam path retracing, and with refocusing either at each reflection or at selected reflections as desired. Thus the adverse effect of optical feedback due to scattering at common reflection points on the mirror surfaces is reduced.

In accordance with one embodiment of the invention, two opposing confocal spherical mirrors are split into halves, each half of each pair being spaced apart to define separate centers of curvature. One pair of mirror halves is rotated 90 degrees in space, thus making the slots separating each pair of mirrors perpendicular.

The above and other objects of the invention, together with its various features and advantages, will become more readily apparent upon consideration of the accompanying drawing and the detailed description thereof which follows.

Figure 2:
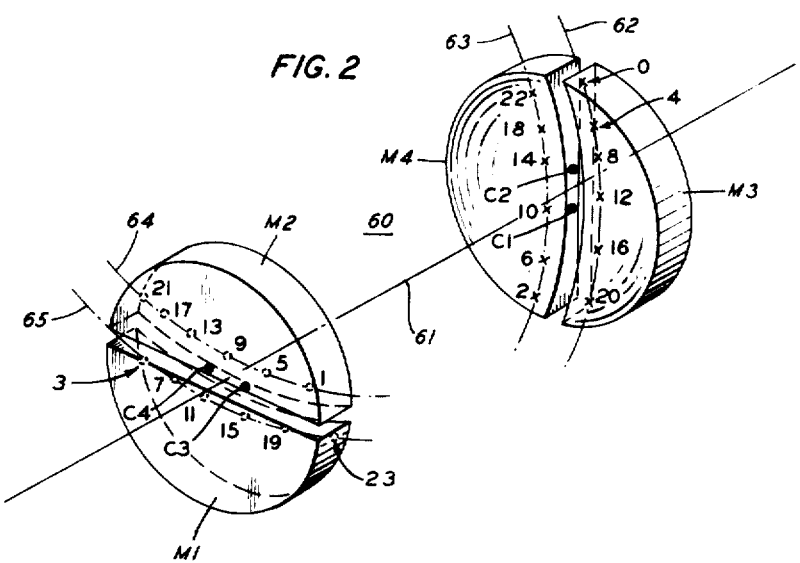
Figure 4:
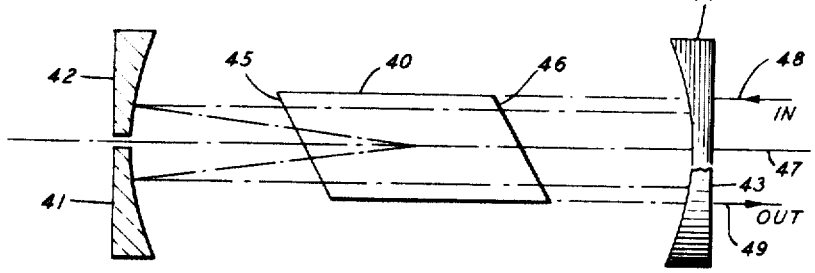
Figure 3:
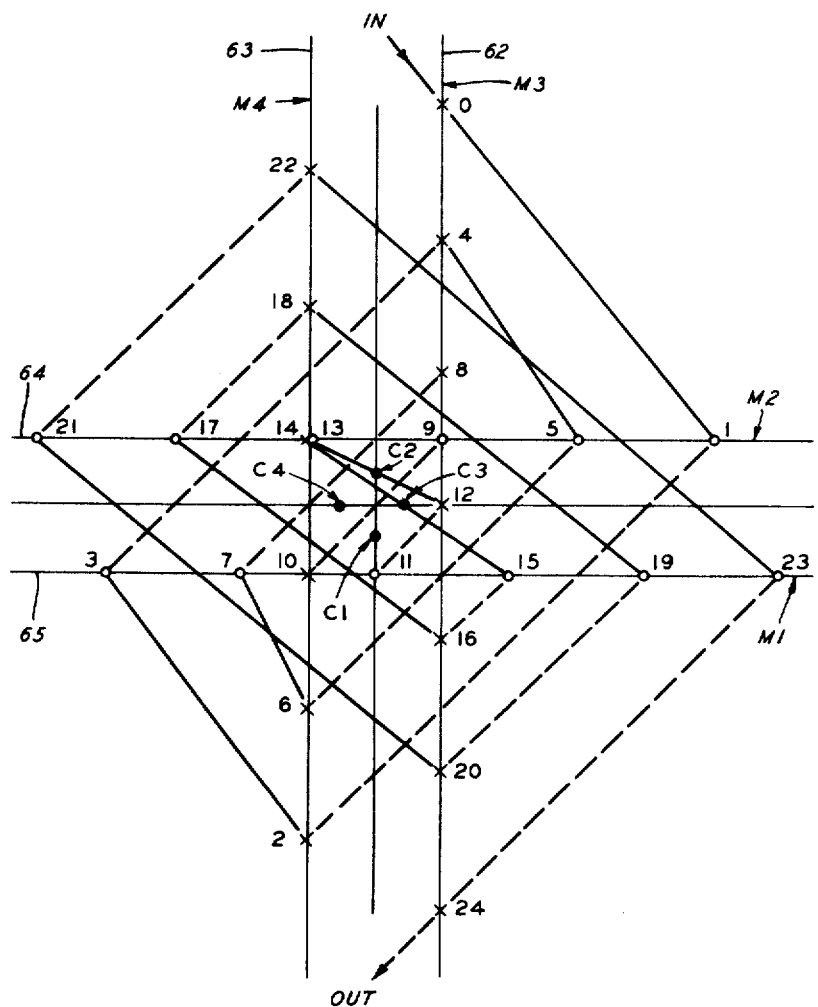

In the drawing:
FIG. 1 is a plan view of the prior art;
FIG. 2 is a perspective view of a light cell in accordance with the invention;
FIG. 3 is a geometrical plot of the beam path in the arrangement of FIG. 2; and
FIG. 4 is a plan view of an optical maser incorporating the light cell of FIG. 2.

Referring now in greater detail to FIG. 1, there is shown a prior art White cell 50 comprising confocal mirrors M1', M2', and M3' disposed in spaced relationship along axis 51 of the cell. In general, the White cell provides a long optical path for an injected beam by refocusing it after each round trip between the opposing mirrors, with a different ray path on each transit. When the incident ray lies in the plane of the three centers of mirror curvature, indicated as C1', C2', and C3', all of the resultant ray paths lie in that plane also. However, if the input ray is slightly inclined to that plane, successive spots on the single mirror fall on opposite sides of the center line, forming two rows of spots. Also, since a given spot on M1' is reciprocally imaged about C3' on M2', all rays terminate in one spot on M1' and one spot on M2'. The volume of the cell traversed by the rays is accordingly a substantially two-dimensional slab.

In the White cell, the total number of light passes is $N=2(s+1)$ where $s$ is the number of spots on the single mirror. The number $s$ depends on the spacing between adjacent spots, which is itself equal to the spacing of C1' and C2', the centers of curvature of the half mirrors M1' and M2'.

When the volume between M3' and M1'–M2' contains a negative temperature medium, the maximum number of light passes permitted is limited by the tendency of the system to break into spontaneous scillation. To preclude such oscillation, the diffraction loss per pass of oscillating modes must exceed the gain per pass of the active medium. Since diffraction loss of the White cell increases with the separation of the centers of curvature of the two half mirrors, a high gain laser will require a large separation, which corresponds to relatively few light passes before the beam exits the cell.

The mentioned limitations are overcome in accordance with the invention as illustrated in the embodiment of FIG. 2 which illustrates a light cell 60 comprising first and second half mirrors M1, M2 with centers of curvature C1, C2 spaced confocally along axis 61 with respect to third and fourth half mirrors M3, M4 with centers of curvature C3, C4. In the four-mirror system of FIG. 2, the line joining centers C1, C2 is orthogonally related to the line joining centers C3, C4. Thus the four centers do not lie in a plane and the ray paths do not overlap or retrace. Whereas in the prior art arrangements, light paths were reflected from a single spot on each of the half mirrors, there are in accordance with the invention now a row of spots on each of the four half mirrors at which a single reflection occurs. The rows of spots on each pair of half mirrors are parallel and the pairs of parallel rows are orthogonal. No light ray therefore strikes the same spot on any mirror twice, and the optical feedback due to scattered radiation from each spot is reduced to $1/N$ times the back scatter from a single spot struck N times. Conversely, the diffraction loss of oscillating modes is significantly increased, and the number of permissible light beam passes before the onset of oscillation is also greatly increased.

The total number of light passes through the four-mirror cell is again determined by $N=2(s+1)$ where $s$ is the total number of spots on mirrors M3, M4, but for the mirror configuration of FIG. 2, N can be larger for a given amount of laser gain without initiating self-oscillation. In addition, the network of rays between the opposing pairs of half mirrors is now able more nearly to traverse the entire circular cylindrical volume between the reflectors, thereby making more efficient use of the negative temperature medium which is disposed there in a laser amplifier arrangement.

A typical beam pattern in the four-mirror cell is indicated in FIGS. 2 and 3, in which a beam enters and leaves at opposite edges of mirror M3. In FIG. 2, a ray entering at position 0 is reflected from mirror M2 at position 1, re-reflected from mirror M4 at position 2, again reflected from mirror M1 at position 3 and finally reflected from mirror M3 at position 4. The cycle continues in the order M3–M2–M4–M1 until the ray emerges at the edge of mirror M3 at position 24. It can be seen that no multiple reflection at any given spot occurs and that no retracing of ray path occurs. The spots are aligned in orthogonal pairs of parallel rows 62, 63, and 64, 65, with the spot separation on a given mirror being equal to twice the separation of the centers of curvature of the mirror path containing the given mirror.

In FIG. 3, which is a perspective view of the ray paths as viewed from behind mirrors M1, M2, the spatial relationships among the beam path segments between reflections are more graphically illustrated. The orthogonal pairs of parallel rows of spots 62, 63 and 64, 65 are numbered as in FIG. 2 for easy reference. An input ray is incident upon the cell at the upper edge of mirror M3 at position 0 and is successively incident, with the same M3–M2–M4–M1 progression as previously, on the mirror surface at spots 1 through 23, emerging at position 24 at the lower edge of mirror M3. If desired, mirror M3 can be notched to permit entry and exit of the beam with a smaller angle of deviation from the normal to the initial reflecting surface. By following the ray tracing in FIG. 3, it can be seen that the ray traverses a major portion of the cylindrical cell volume and is therefore able more efficiently to interact with any media through which it passes.

A typical optical maser embodiment incorporating the invention is shown in plan view in FIG. 4 in which a negative temperature medium 40 is disposed within a cell comprising spherical mirrors 41, 42, 43, 44 positioned in pairs as explained with reference to FIG. 2. Medium 40 can be either a solid or a gaseous medium in which the negative temperature condition requisite for optical maser action can be attained. Surfaces 45, 46 advantageously are oriented at the Brewster angle with respect to cell axis 47 in the now well-known manner. In the operation of the laser of FIG. 4, an input ray 48 is incident upon the cell formed by the end reflectors 41 through 44 and, after repeated nonretracting reflections therein, emerges as ray 49, having been amplified by interaction with the active medium 40. The well-known excitation means, which can provide either a DC or RF discharge, either continuous or pulsed, within medium 40 for establishing the negative temperature condition therein, are not shown in the interest of simplifying the drawing. For a more complete description of the physical principles involved in laser action see the article by A. Yariv and J. P. Gordon entitled "The Laser," published in the January 1963 issue of the Proceedings of the Institute of Radio Engineers.

In all cases, it is to be understood that the above-described embodiment is only representative of the principles of the invention. Numerous and varied other embodiments can be devised in accordance with these principles by those skilled in the art without involving invention.

Thus, for example, an arrangement of four confocal spherical mirrors can be used to refocus the beam on each pass through the cell; a system which refocuses after $2n$ passes evolves if only two mirrors are confocal; and a system adapted to refocus after $4n$ passes is realized if only one mirror has a focal length equal to its separation from the center of the opposite mirror pair.

What is claimed is:

1. A multiple pass optical cell comprising two opposing pairs of energy reflectors having separated centers of curvature, the lines defined by said separated centers of curvature of each pair being mutually orthogonal, said reflectors defining a folded light beam path which is incident on each reflector in a row of spots, at least one of said centers of curvature falling in the vicinity of the surface of one of said opposing reflectors, the orthogonal orientation of said lines and the location of said centers causing said row of spots on the reflectors of each pair to be parallel and the opposite pairs of rows to be mutually orthogonal whereby optical feedback due to scattering at common points of reflection is substantially eliminated.

2. In combination with an optical cell according to claim 1, a negative temperature medium disposed within said cell on the axis thereof.

3. An optical cell having a given axis and comprising a first pair of energy reflectors symmetrically spaced apart at one end of said axis about a first plane containing said axis, said first pair of reflectors having centers of curvature C1, C2 associated therewith, a second pair of energy reflectors symmetrically spaced apart at the opposite end of said axis about a second plane containing said axis, said second pair of reflectors having centers of curvature C3, C4 associated therewith, said first and second planes being orthogonal, at least one of said centers of curvature falling in the vicinity of the surface of an opposing reflector.

4. The cell according to claim 3 in which at least two of said centers of curvature fall in the vicinity of the surfaces of opposing reflectors.

5. The cell according to claim 3 in which all of said centers of curvature fall in the vicinity of the surfaces of the opposing reflectors.

6. An optical maser comprising
an optical cell comprising first, second, third, and fourth reflectors arranged in spaced pairs at the cell extremities, and
a negative temperature medium interposed between said pairs of reflectors,
said pairs of reflectors being symmetrically spaced apart about first and second planes which are orthogonal,
at least one of said reflectors being characterized by a center of curvature in the vicinity of the surface of one other of said reflectors.

No references cited.

ROY LAKE, *Primary Examiner.*

DARWIN R. HOSTETTER, *Assistant Examiner.*

U.S. Cl. X.R.

330—53; 350—294, 299